(12) United States Patent
Borean et al.

(10) Patent No.: US 10,728,842 B2
(45) Date of Patent: Jul. 28, 2020

(54) METHODS AND SYSTEMS FOR OPPORTUNISTICALLY CONNECTING DEVICES TO A COMMUNICATION NETWORK

(71) Applicant: TELECOM ITALIA S.p.A., Milan (IT)

(72) Inventors: Claudio Borean, Turin (IT); Paolo Gallo, Turin (IT); Roberta Giannantonio, Turin (IT); Dario Mana, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 108 days.

(21) Appl. No.: 15/780,012

(22) PCT Filed: Dec. 28, 2015

(86) PCT No.: PCT/EP2015/081289
§ 371 (c)(1),
(2) Date: May 30, 2018

(87) PCT Pub. No.: WO2017/114549
PCT Pub. Date: Jul. 6, 2017

(65) Prior Publication Data
US 2018/0359696 A1 Dec. 13, 2018

(51) Int. Cl.
*H04W 48/20* (2009.01)
*H04W 4/70* (2018.01)
(Continued)

(52) U.S. Cl.
CPC .......... *H04W 48/20* (2013.01); *H04L 67/025* (2013.01); *H04L 67/141* (2013.01); *H04W 4/38* (2018.02);
(Continued)

(58) Field of Classification Search
CPC ......... H04W 48/20; H04W 4/38; H04W 4/70; H04W 24/02; H04W 48/16; H04W 4/80;
(Continued)

(56) References Cited

U.S. PATENT DOCUMENTS

| | | | |
|---|---|---|---|
| 9,021,081 B2 * | 4/2015 | Sewall | H04L 12/287 709/224 |
| 2004/0052223 A1 | 3/2004 | Karaoguz et al. | |

(Continued)

OTHER PUBLICATIONS

International Search Report and Written Opinion dated Sep. 8, 2016 in PCT/EP2015/081289 filed Dec. 28, 2015.

*Primary Examiner* — Julio R Perez
(74) *Attorney, Agent, or Firm* — Oblon, McClelland, Maier & Neustadt, L.L.P.

(57) ABSTRACT

A method and system for providing a wireless communication network for a smart device are provided, the device including wireless communication circuitry, the method including: analyzing information regarding a plurality of hotspots in a geographic area in which the device is deployed, each hotspot being configured to establish a wireless communication within a predetermined range; estimating, based on the analyzing, an extent of coverage provided by the plurality; checking, based on the estimating, whether at least one hotspot is able to provide the communication to the device, and if so, configuring the hotspot to provide the communication, otherwise modifying an operating behavior of a selected hotspot in order to provide the communication, the modifying including selecting the hotspot from the plurality, sending a request for modifying an operating behavior of the selected hotspot to provide the communication, and verifying that the operating behavior has been modified.

21 Claims, 5 Drawing Sheets

(51) Int. Cl.
  H04W 24/02    (2009.01)
  H04W 48/16    (2009.01)
  H04W 4/38     (2018.01)
  H04L 29/08    (2006.01)
  *H04W 4/80*       (2018.01)
  *H04W 84/18*      (2009.01)
  *H04W 16/22*      (2009.01)
  *H04W 88/18*      (2009.01)

(52) U.S. Cl.
  CPC ............ H04W 4/70 (2018.02); H04W 24/02 (2013.01); H04W 48/16 (2013.01); *H04L 67/16* (2013.01); *H04W 4/80* (2018.02); *H04W 16/22* (2013.01); *H04W 84/18* (2013.01); *H04W 88/18* (2013.01)

(58) Field of Classification Search
  CPC ..... H04W 84/18; H04W 16/22; H04W 88/18; H04L 67/025; H04L 67/141; H04L 67/16
  See application file for complete search history.

(56) References Cited

U.S. PATENT DOCUMENTS

| | | |
|---|---|---|
| 2005/0014484 A1 | 1/2005 | Karaoguz et al. |
| 2007/0121838 A1 | 5/2007 | Karaoguz et al. |
| 2007/0121839 A1* | 5/2007 | Karaoguz .......... G06Q 10/0637 379/114.1 |
| 2007/0167173 A1 | 7/2007 | Halcrow et al. |
| 2008/0059315 A1 | 3/2008 | Karaoguz et al. |
| 2011/0099072 A1 | 4/2011 | Karaoguz et al. |
| 2013/0308470 A1 | 11/2013 | Bevan et al. |
| 2014/0036656 A1 | 2/2014 | Chou et al. |
| 2014/0036664 A1 | 2/2014 | Han et al. |
| 2014/0036769 A1 | 2/2014 | Stojanovski et al. |
| 2014/0036792 A1 | 2/2014 | Li et al. |
| 2014/0036793 A1 | 2/2014 | Johnsson et al. |
| 2014/0036794 A1 | 2/2014 | Koc et al. |
| 2014/0036795 A1 | 2/2014 | Martinez Tarradell et al. |
| 2014/0036796 A1 | 2/2014 | Etemad et al. |
| 2014/0036876 A1 | 2/2014 | Li et al. |
| 2014/0038623 A1 | 2/2014 | Davydov et al. |
| 2014/0040498 A1 | 2/2014 | Oyman et al. |
| 2014/0040504 A1 | 2/2014 | Gupta |
| 2014/0112300 A1 | 4/2014 | Han et al. |
| 2014/0211691 A1* | 7/2014 | Emadzadeh .......... H04W 64/00 370/328 |
| 2015/0139197 A1 | 5/2015 | He et al. |
| 2015/0156702 A1 | 6/2015 | Stojanovski et al. |
| 2015/0181564 A1 | 6/2015 | Rao et al. |
| 2015/0189521 A1 | 7/2015 | Chou et al. |
| 2015/0189591 A1 | 7/2015 | Koc et al. |
| 2015/0201375 A1 | 7/2015 | Vannithamby et al. |
| 2015/0305077 A1 | 10/2015 | Johnsson et al. |
| 2015/0334157 A1 | 11/2015 | Oyman et al. |
| 2016/0007216 A1 | 1/2016 | Chou et al. |
| 2016/0100384 A1 | 4/2016 | Etemad et al. |
| 2016/0100441 A1 | 4/2016 | Li et al. |
| 2016/0192408 A1 | 6/2016 | Martinez Tarradell et al. |

* cited by examiner

METHODS AND SYSTEMS FOR OPPORTUNISTICALLY CONNECTING DEVICES TO A COMMUNICATION NETWORK

BACKGROUND OF THE INVENTION

Field of the Invention

The present invention relates to telecommunication methods and systems. In details, embodiments of the present invention relate to methods and systems for opportunistically connecting electronic devices to a communication network. Embodiments of the present invention propose methods and systems for opportunistically connecting devices belonging to the Internet of Things (IoT) typology to a wireless communication network.

Overview of the Related Art

The Internet of Things, or IoT, is a wide spreading technology that allows new functionalities and the provision of new services to a wide array of different physical objects and devices, generally indicated as smart devices in the following for the sake of brevity.

Smart devices may belong to any typology of artifacts such as for example garbage bins, metering devices (e.g., gas meter), wearable sensors (e.g., heart rate monitors), vending machines, cars, traffic lights, etc.

Each smart device, regardless of its typology, comprises sensing circuitries, such as for example one or more sensors, for acquiring information on the smart device operation, status and/or on surrounding environment of the smart device.

Moreover, each smart device comprises communication circuitries for connecting to a communication network accessing the Internet (even though connection to dedicated networking systems are not excluded) in order to upload the information acquired through the sensing circuitry and/or receive configuration information and/or commands/instructions, from, for example, a controlling entity (e.g., a managing system, implemented in a remote server, data center, personal computer, etc.) also connected to the Internet.

The communication circuitries may be arranged for exploiting one or more wireless communication systems such as for example 2G, 3G, 4G cellular networks, Wi-Fi, Bluetooth®, ZigBee® networks and/or wired communication systems such as for example xDSL cables and/or power lines.

Preferably, smart devices also comprise computing circuitries, such as for example microprocessors, for processing information acquired by the sensing circuitries and/or received from the controlling entity through the communication circuitries.

Examples of IoT services that could be implemented by exploiting smart devices comprise smart garbage bins and/or trash cans equipped with sensors that can monitor whether they are filled in, in order to dynamically set the pickup time and optimize the garbage collection process by communicating with a management system that plans garbage/trash collection times and routes, or smart parking systems where a parking lot status (number of available or occupied parking spaces) can be monitored by sensors and communicated to cars or drivers within a predetermined range from the parking lot.

The deployment of communication network infrastructures dedicated to smart devices results to be extremely expensive in terms of required resources (e.g., communication apparatuses, time/personnel required for the deployments and for their maintenance), particularly in 'open air' environments, such as for example urban environments (i.e., along streets, squares, etc.), due to the extension of the area to cover, obstacles comprised in the area (particularly in case of wireless communication systems), and cost of public and/or private properties occupied by communication network infrastructures dedicated to smart devices.

Therefore, expedients have been proposed in the art in order to exploit existing communication network for connecting smart devices to the Internet.

For example, Wijnants M., Lamotte W., Letor N., Blondia C., Poorter E. D., Naudts D., Verstichel S., Lannoo B., Moerman I., Matthys N., Huygens C., "An Eco-friendly Hybrid Urban Computing Network Combining Community-based Wireless LAN Access and Wireless Sensor Networking", IEEE International Conference on Green Computing and Communications (GreenCom), pp. 410-417, 20-23 Nov. 2012, discloses a design of a hybrid municipal network infrastructure that integrates a community-based Wi-Fi access network with Wireless Sensor Network (WSN) functionality. The community-based Wi-Fi access network component provides free wireless Internet connectivity by harvesting the Internet subscriptions of city inhabitants. To minimize session interruptions for mobile clients, this subsystem incorporates technology that achieves (near-) seamless handover between Wi-Fi access points. The WSN component on the other hand renders it feasible to sense physical properties and to realize the Internet of Things (IoT) paradigm. This in turn scaffolds the development of value-added end-user applications that are consumable through the community-powered access network. The WSN component invests substantially in ecological considerations by means of a green distributed reasoning framework and sensor middleware that collaboratively aim to minimize the network's global energy consumption.

Bin Guo, Daqing Zhang, Zhu Wang, Zhiwen Yu, Xingshe Zhou, "Opportunistic IoT: Exploring the harmonious interaction between human and the internet of things", Journal of Network and Computer Applications Volume 36, Issue 6, November 2013, Pages 1531-1539, discloses opportunistic IoT, which is formed based on the ad hoc, opportunistic networking of devices (e.g., mobile phones and smart vehicles) using short-range radio techniques (e.g., Bluetooth and Wi-Fi). The opportunistic IoT demonstrates inherently the close relationship between human and opportunistic connection of smart things. The opportunistic IoT enables information forwarding and dissemination within and among the opportunistic communities formed based on the movement and opportunistic contact nature of human.

Riccardo Pozza, "Knowledge driven Discovery for Opportunistic IoT Networking", Institute for Communication Systems Faculty of Engineering and Physical Sciences, University of Surrey Guildford, UK, July 2015, discloses that Opportunistic Networking paradigm, exploiting opportunistic interactions between static and mobile IoT devices, provides for increased network capacity, additional connectivity, reduced deployment costs. Therefore, a discovery process in IoT needs to determine the availability of other IoT devices in a scenario in which a presence of IoT devices is uncertain or may change over time. This directly leads to a contradicting objective where resource consumption in IoT devices due to perform the discovery process is to be kept at a minimum. A Context Aware Resource Discovery mechanism is introduced, capable of providing an optimized discovery process and adapting available resources based on learned mobility patterns of IoT devices. In addition, an Arrival and Departure Time Prediction and Discovery framework is defined and investigated; this framework aims at predicting future arrival and departure times of IoT devices and helps to plan the use of resources of IoT devices in advance based on the foreseen resource demand patterns.

SUMMARY OF THE INVENTION

The Applicant has observed that, generally, methods and systems known in the art provide an unsatisfactory connectivity to smart devices (i.e. deploying and managing a communication network serving the smart devices).

Particularly, the Applicant has observed that opportunistic networks for smart device known in the art fail in providing connectivity thoroughly throughout a generic geographic zone (e.g., a city district, a whole city, a municipality, etc.). For example, areas of the geographic zone may result uncovered by any IoT dedicated communication infrastructure and/or other kinds of public/private communication networks (e.g., Wi-Fi based WLANs) to which smart devices could opportunistically connect. Even connection between fixed and mobile smart devices could be unfeasible in areas excluded from routes traveled by owners of the mobile smart devices.

Therefore, smart devices may happen to be deployed in generic 'blind' areas of the geographic zone, i.e. areas substantially lacking of any connectivity for smart devices, thus being unable to communicate with a managing entity (e.g., a managing server) and/or other smart devices.

The Applicant has thus aimed at proposing a solution capable of providing and managing reliable opportunistic network for serving smart devices.

Embodiments of the proposed solution is particularly, although not limitatively, suited for providing and managing an opportunistic network to smart devices deployed in metropolitan areas (i.e., urban environments).

The Applicant has found that an opportunistic network may be provided by exploiting existing telecommunication provider assets, i.e. existing assets already deployed or that could be deployed in the area such as for example home network devices (e.g., access gateways), user equipment (e.g., smartphones, tablets, portable computers, etc.) that may be exploited as hotspots for providing connectivity to smart devices.

The term 'hotspot' is used herein to indicate any device capable of acting as a concentrator capable to connect to one or more smart devices, preferably by means of one or more low-power wireless communication technologies (e.g., Wi-Fi, Bluetooth©, Bluetooth Smart©, Thread©, ZigBee©, Radio Frequency Identification—RFID, and/or Near Field Communication—NFC, etc.) and, at the same time, to connect with a communication network (e.g., a mobile communication network, a Wireless Local Area Network, etc.), thus allowing the one or more smart devices accessing to a computer network, e.g. the Internet.

Particularly, the Applicant has found that owners of existing assets usable as hotspots (e.g., user equipment and/or wireless access gateway) can be engaged in order to provide (at least temporary) connectivity to smart devices deployed in areas with connectivity issues.

The engagement of the owner may be leveraged by exploiting incentives associated with the user equipment (e.g., usable through the user equipment). For example, incentives may comprise temporary increase of available bitrate, priority channels for accessing to one or more predetermined services (e.g., streaming services), discounts on services fees, extension of subscribed services and/or additional services (e.g., free access to multimedia contents).

The Applicant has found that it is possible to provide reliable opportunistic network capabilities to smart devices while avoiding the use of the existing mobile cellular network (e.g. 2G/3G/4G) and/or eliminating the need of an ad-hoc infrastructure for providing connectivity to smart devices, thus attenuating energy consumption (e.g., prolonging the battery life of the smart devices) and design complexity of the smart devices and/or reducing implementation complexity and costs of a widespread presence of operating smart devices in the generic geographic zone.

The Applicant has further found that is possible to provide a reliable opportunistic network for serving smart devices by estimating a connectivity level in areas where smart devices are deployed and engaging existing assets (e.g., automatically or through their owners) in order to provide connectivity to smart devices in those areas.

Particularly, one aspect of the present invention proposes a method for providing a wireless communication network for a smart device, wherein the smart device comprises wireless communication circuitries. The method comprises: analyzing information regarding a plurality of hotspots in a geographic area wherein the smart device is deployed, each hotspot being capable of establishing one or more wireless communications within a predetermined range; based on said analyzing, estimating an extent of coverage of the wireless communication network provided by the plurality of hotspots; based on said estimating, checking whether at least one hotspot in the geographic area is able to provide wireless communication to the smart device. If at least one hotspot in the geographic area is able to provide wireless communication to the smart device, configuring the at least one hotspot to provide wireless communication to the smart device, else, if no hotspot in the geographic area is able to provide wireless communication to the smart device, modifying an operating behavior of at least one selected hotspot in order to provide wireless communication to the smart device. Said modifying an operating behavior of at least one hotspot comprises: selecting at least one hotspot from the plurality of hotspots; sending a request for modifying an operating behavior of the at least one selected hotspot in order to provide wireless communication to the smart device, and verifying that the operating behavior of the at least one selected hotspot has been modified as requested.

Preferred features of the present invention are set forth in the dependent claims.

In an embodiment of the invention, the plurality of hotspots comprises at least one wireline hotspot comprising a wired connection to a computer network and at least one antenna for wireless communicating with the smart device, and wherein selecting at least one hotspot from the plurality of hotspots comprises selecting the at least one wireline hotspot, and sending a request for modifying an operating behavior of the at least one selected hotspot comprises sending a request for activating the at least one wireline hotspot to the owner thereof.

In an embodiment of the invention, the plurality of hotspots comprises at least one mobile hotspot capable to wirelessly connect to the smart device, and selecting at least one hotspot from the plurality of hotspots comprises selecting the at least one mobile hotspot, and sending a request for modifying an operating behavior of the at least one selected hotspot comprises sending to the owner of the at least one mobile hotspot a request for steering from a traveled usual path in order to provide wireless communication to the smart device.

In an embodiment of the invention, said modifying an operating behavior of at least one hotspot further comprises tracking the at least one mobile hotspot after sending the request for steering from a traveled usual path.

In an embodiment of the invention, checking whether at least one hotspot in the geographic area is able to provide wireless communication to the smart device comprises checking whether at least one hotspot is able to provide wireless communication at a requested location and at a requested time instant defined a by a connectivity request associated with the smart device.

In an embodiment of the invention, estimating an extent of coverage of the wireless communication network provided by the plurality of hotspots comprises determining activation/deactivation patterns of the plurality of hotspots as a function of time.

In an embodiment of the invention, estimating an extent of coverage of the wireless communication network provided by the plurality of hotspots further comprises determining a location of the at least one mobile hotspot as a function of time.

In an embodiment of the invention, estimating an extent of coverage of the wireless communication network provided by the plurality of hotspots further comprises determining a probability of coverage map that accounts for a probability of the availability of the wireless communication network as a function of position of the hotspots within the geographic area and time.

In an embodiment of the invention, each position of the hotspots within the geographic area in the probability of coverage map is defined by spatial information comprising longitude, latitude and height information.

In an embodiment of the invention, the method further comprises rewarding the at least one selected hotspot with an incentive once it is ascertained that the operating behavior of the at least one selected hotspot has been modified as requested.

In an embodiment of the invention, the smart device exploits the wireless communication network for exchanging data with a controlling entity. Preferably, rewarding the at least one selected hotspot with an incentive comprises ascertaining whether the smart device has exchanged data with the controlling entity.

In an embodiment of the invention, rewarding the at least one selected hotspot with an incentive comprises ascertaining whether the at least one tracked mobile hotspot has steered from a traveled usual path in order to provide wireless communication to the smart device.

In an embodiment of the invention, rewarding the at least one selected hotspot with an incentive comprises rewarding the at least one selected hotspot with an incentive whether the smart device has exchanged data with the controlling entity, and/or the at least one tracked mobile hotspot has steered from the traveled usual path.

In an embodiment of the invention, the hotspots of the plurality of hotspots comprise connectivity functionalities for providing wireless communication to the smart device and further comprising rewarding at least one selected hotspot with an incentive for maintaining active the connectivity functionalities.

In an embodiment of the invention, rewarding the at least one selected hotspot with an incentive comprises selecting as an incentive at least one among an increase of an available bandwidth or a temporary increase of an available bandwidth assigned to the hotspot, an increase of available bitrate or a temporary increase of available bitrate, priority channels for accessing to one or more predetermined services, discounts on services fees, extension of subscribed services and/or additional services In an embodiment of the invention, the method further comprises modifying a wireless communication network access scheduling of the smart device in correspondence of a time instant having a greater probability of the availability of the wireless communication network based on the probability of coverage map.

In an embodiment of the invention, analyzing information regarding a plurality of hotspots comprises exploiting at least one hotspot of the plurality of hotspots for acquiring data regarding the extent of coverage of wireless communication provided by the hotspots of the plurality of hotspots, and preferably exploiting at least one hotspot for acquiring data regarding mobility and/or activation/deactivation patterns of the hotspots of the plurality of hotspots.

Another aspect according to the present invention, proposes a system for providing a wireless communication network for a smart device, wherein the smart device comprises wireless communication circuitries. The system comprises a coverage estimator arranged for analyzing information regarding a plurality of hotspots in a geographic area wherein the smart device is deployed, each hotspot being capable of establishing one or more wireless communications within a predetermined range; based on said analyzing, estimating an extent of coverage of the wireless communication network provided by the plurality of hotspots. The system further comprises a coverage improver arranged for receiving the estimation of the extent of coverage of the wireless communication network performed by the coverage estimator; based on said estimation, checking whether at least one hotspot in the geographic area is able to provide wireless communication to the smart device, and if at least one hotspot in the geographic area is able to provide wireless communication to the smart device, configuring the at least one hotspot to provide wireless communication to the smart device, else, if no hotspot in the geographic area is able to provide wireless communication to the smart device, modifying an operating behavior of at least one selected hotspot in order to provide wireless communication to the smart device. In order to modifying an operating behavior of at least one hotspot, the coverage improver is arranged for: selecting at least one hotspot from the plurality of hotspots; sending a request for modifying an operating behavior of the at least one selected hotspot in order to provide wireless communication to the smart device, and verifying that the operating behavior of the at least one selected hotspot has been modified as requested.

In an embodiment of the invention, the system further comprises a connectivity managing entity comprising at least one among single computer, a network of distributed computers, network of distributed virtual machines, and wherein the coverage estimator and the coverage improver are implemented in the connectivity managing entity.

In an embodiment of the invention, each hotspot of the plurality of hotspots comprises functionalities arranged for managing an interaction with the connectivity managing entity, which is implemented by a firmware and/or software product which is instantiated on one or more circuitry of the hotspot.

In an embodiment of the invention, the second functionality is arranged for configuring the at least one hotspot to provide wireless communication to the smart device by means of wireless communication technologies operating at transmission power equal to, lower than, 100 mW.

In an embodiment of the invention, the second functionality is arranged for configuring the at least one hotspot to provide wireless communication to the smart device by means of wireless communication technologies operating within ranges one hundred meters.

In an embodiment of the invention, the second functionality is arranged for configuring the at least one hotspot to provide wireless communication to the smart device by means of at least one wireless communication technologies chosen among Wi-Fi, Bluetooth©, Bluetooth Smart©, Thread©, ZigBee©, Radio Frequency Identification, and Near Field Communication.

In an embodiment of the invention, the system is further configured for rewarding the at least one selected hotspot with an incentive once it is ascertained that the operating behavior of the at least one selected hotspot has been modified as requested in order to provide wireless communication to the smart device.

BRIEF DESCRIPTION OF THE DRAWINGS

These and others features and advantages of the solution according to the present invention will be better understood by reading the following detailed description of an embodiment thereof, provided merely by way of non-limitative examples, to be read in conjunction with the attached drawings, wherein.

DETAILED DESCRIPTION OF THE INVENTION

Figure 1:
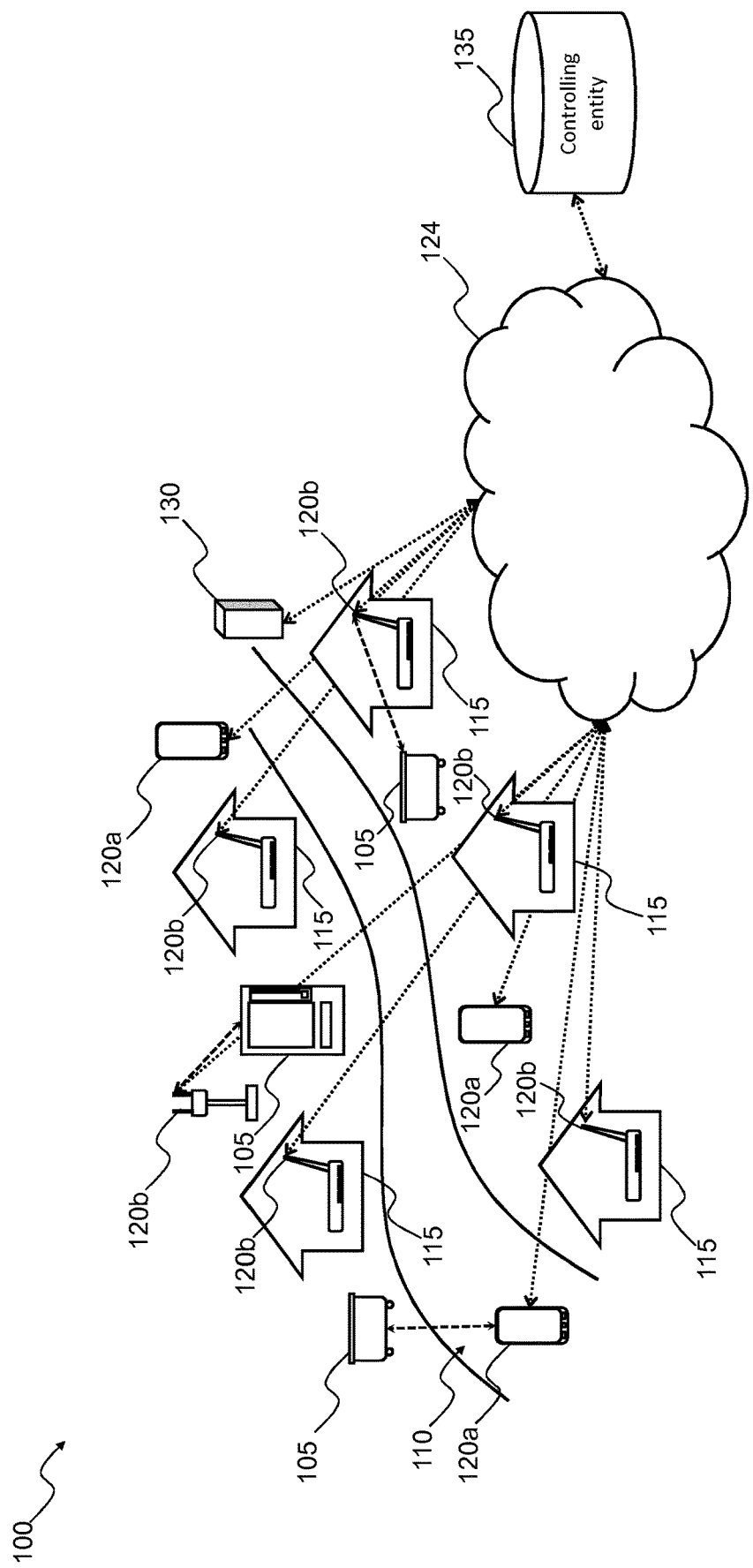
FIG. 1 is a schematic representation of a generic geographic area in which smart devices are deployed.

With reference to the drawings, FIG. 1 is a schematic representation of a generic geographic area, indicated in brief as area 100 in the following, in which physical objects and devices comprising embedded electronics (as described in the following) capable of operating in one or more networks (generally referred to as Internet of Things networks) for collecting and exchanging data are deployed.

In the following, physical objects and devices comprising embedded electronics are generally identified by the term 'smart devices' 105 for the sake of brevity. For the purposes of the present disclosure, by "smart device" it is meant any object belonging to the Internet of Things, or IoT, typology, where the IoT is a network of physical objects or "things" equipped with electronics, software, sensors, and network connectivity, which enables these objects to collect and exchange data (as described in the following).

The area 100, considered in the example of FIG. 1, is a city or town part that comprises a portion of a street 110 surrounded by one or more buildings 115. Nevertheless, to the purposes of the invention, the area 100 could be wider such as for example the area 100 could comprise an entire city or municipality.

Generally, within the area 100 a plurality of hotspots 120 are, at least temporarily, available. With the term hotspots 120 are herein indicated any devices capable of acting as concentrators capable of establishing one or more wireless communication within a predetermined range (e.g., defined by a type of hotspot 120, a communication technology used, an available power, etc.) and, at the same time, establishing a connection with a communication network (e.g., a mobile communication network, a Wireless Local Area Network, etc.) allowing access to a computer network, e.g. the Internet 124.

Preferably, the hotspots 120 exploit one or more low-power wireless communication technologies, such as for example Wi-Fi, Bluetooth©, Bluetooth Smart©, Thread©, ZigBee©, Radio Frequency Identification—RFID, and/or Near Field Communication—NFC, etc.

For example, hotspots 120 may comprise mobile hotspots, which are portable communicating device capable to connect to one or more networks in a complete wireless manner such as for example user equipment 120*a* (smartphones, tablets, telecommunication arrangements for vehicles/drones, etc.) and which may be configured for providing a connection to third devices, i.e. smart devices 105.

Hotspots 120 may further comprise fixed, or wireline hotspots 120*b* such as for example private and/or public access gateways (e.g., home/business modems and routers, 'free Wi-Fi' arrangements, comprising one or more antennas, modems and routers), which are devices comprising a wired connection (e.g., a xDSL or fiber optic cable) and one or more antennas for wireless communicating with terminal devices (e.g., personal computers, smartphones, and/or tablets).

In alternative or in addition, wireline hotspots 120 may also comprise modems and routers possibly provided in telecommunication provider cabinet 130.

Within the area 100 a plurality of smart devices 105 are deployed.

Smart devices 105 may belong to any typology of artifacts such as for example garbage bins, metering devices (e.g., gas meters), wearable sensors (e.g., heart rate monitors; not shown in FIG. 1), vending machines, vehicles (not shown in FIG. 1), traffic lights (not shown in FIG. 1), etc.

Figure 2:
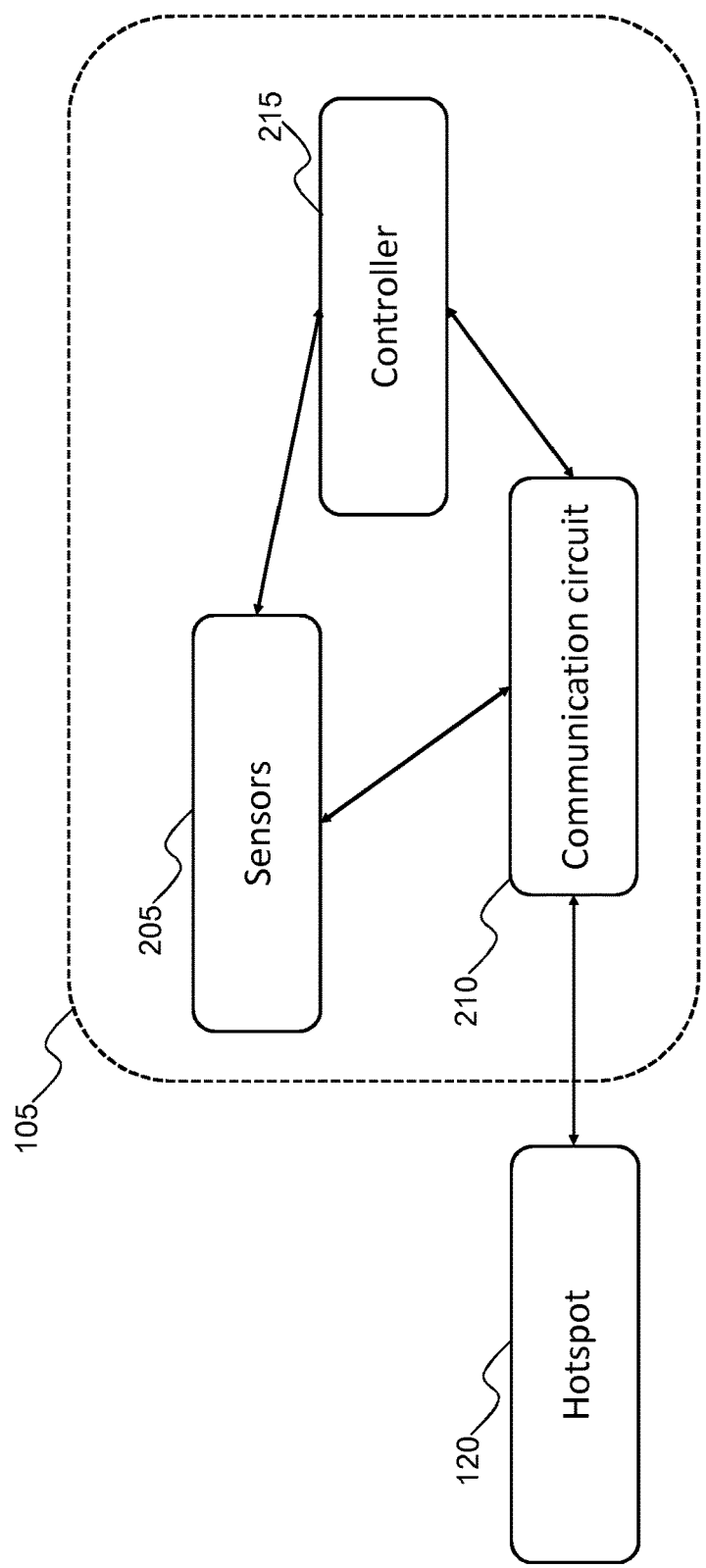
FIG. 2 is a schematic block diagram of electronic circuitries equipped in a smart device.

With reference to FIG. 2, which is a schematic block diagram of electronic circuitries equipped in a generic smart device 105, each smart device 105 generally comprises sensing circuitries, or sensors 205 (such as for example one or more sensors—e.g., temperature sensors, weight sensors, pressure sensors, proximity sensors, light sensors, etc.) for acquiring information on the smart device operation, status and/or on the environment surrounding the smart device 105, communication circuitries 210 (e.g., antennas, modem, etc.) for connection with a communication network (e.g., as described in the following) for accessing the Internet 124 (even though connections to dedicated networking systems are not excluded) in order to exchange data with a respective controlling entity 135 (only one of which shown in FIG. 1, e.g. a managing system preferably implemented in a remote server, data center, one or more personal computers, etc.), and controlling circuitries, or controller 215 (e.g., one or more microprocessors, ASICs, FPGAs, microcontroller, microcomputers, etc.) for processing information acquired by the sensing circuitries 205 and/or received from the controlling entity.

An embodiment of the present invention provides a "backbone infrastructure" for the smart devices 105 to connect to the Internet 124 and to the controlling entity 135.

Particularly, an embodiment of the present invention provides an opportunistic communication network and manages the connection between the opportunistic communication network and the smart devices 105. Preferably, the communication network is a wireless communication network.

An embodiment of the present invention comprises leveraging on existing networking assets, i.e. the hotspots 120, managed/served by a telecommunication provider in the area 100 where the wireless communication network for smart devices 105 is to be provided.

Moreover, an embodiment of the invention provides procedures for establishing and managing the opportunistic communication network serving smart devices 105.

Figure 3A:
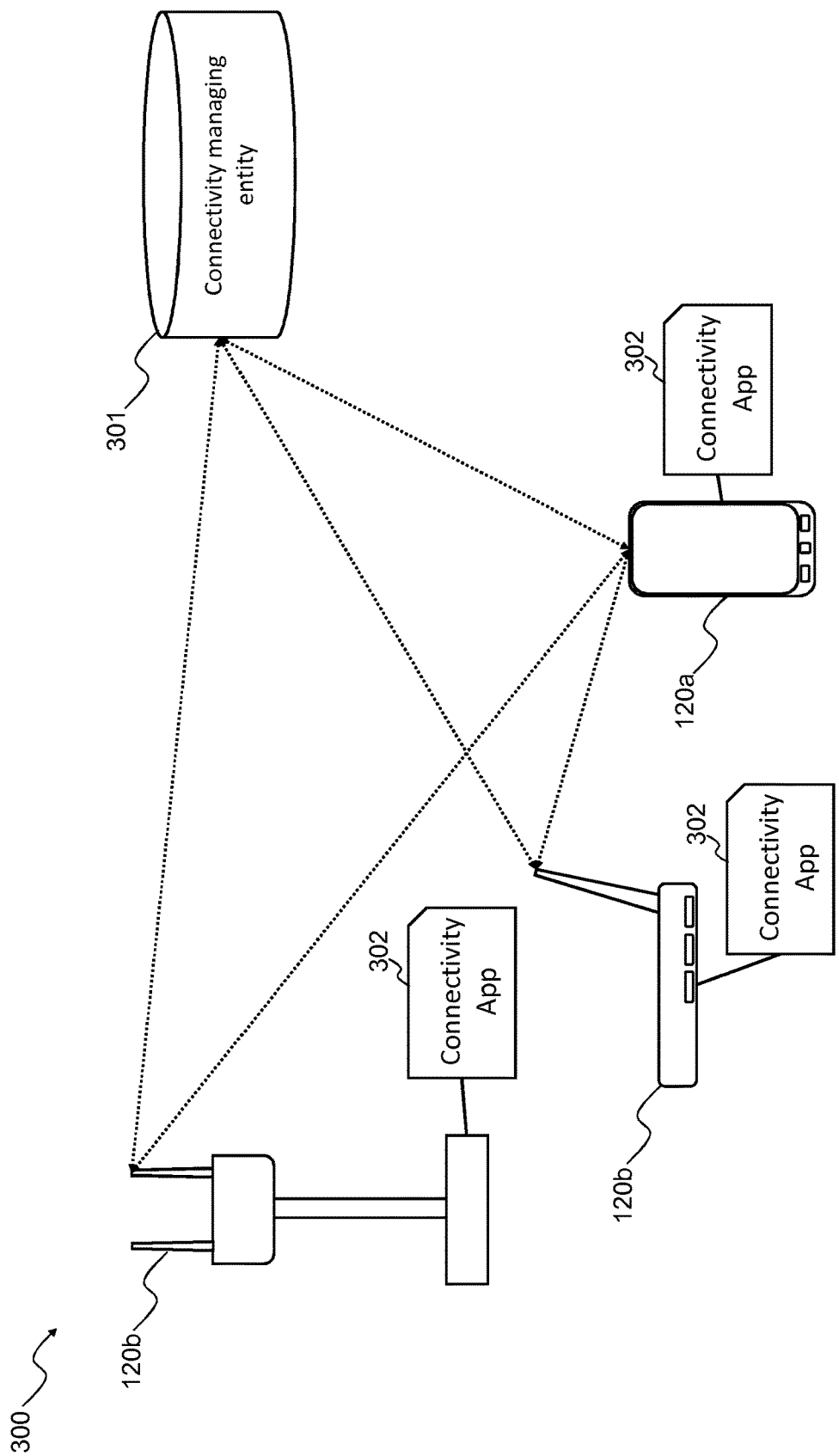
FIG. 3A is a schematic representation of a system for providing and managing connectivity for smart devices according to an embodiment of the invention.
Figure 3B:
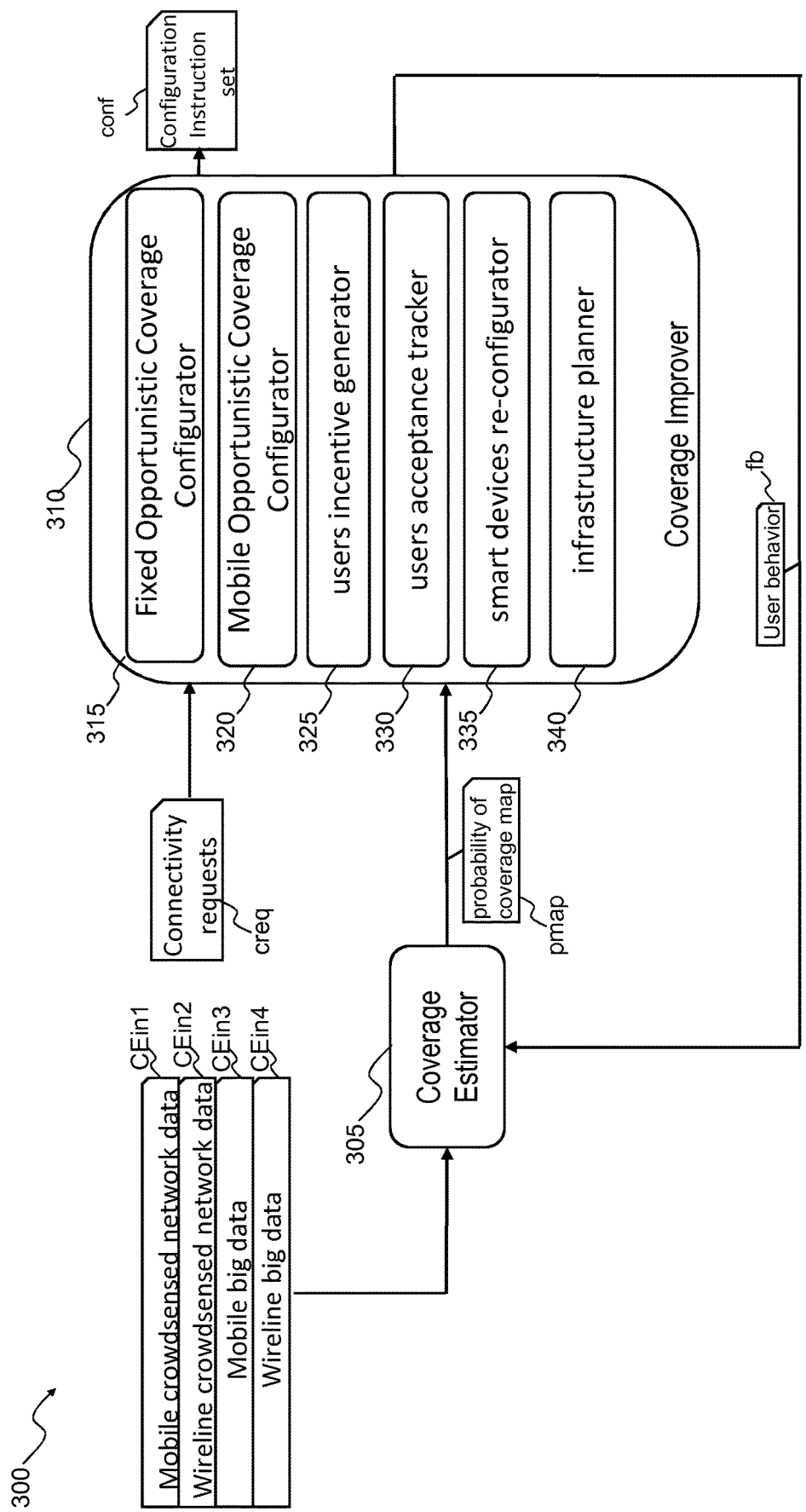
FIG. 3B is a conceptual schematic block diagram of a system for providing and managing connectivity for smart devices according to an embodiment of the invention.

A system 300 for providing and managing (wireless) connectivity for smart devices 105, i.e. establishing and managing the communication network serving the smart devices 105, according to an embodiment of the present invention is now described by referring to FIGS. 3A and 3B, which are schematic block diagrams thereof.

The system 300 according to an embodiment of the present invention is a preferably dynamic and autonomous system that is able to provide and maintain an opportunistic communication network for smart devices 105.

The term 'opportunistic' herein used indicates an 'ad hoc' communication network based on existing hotspots 120 in the area and established for providing the smart devices 105 at least a temporary access to the Internet 124.

For example, with reference to FIG. 3A, the system 300 may comprise a connectivity managing entity 301 comprising a single computer, or a network of distributed computers, either of physical type (e.g., with one or more dedicated computer network machines, such as for example a dedicated remote server, data center, one or more personal computers, etc.) or of virtual type (e.g., by implementing one or more virtual machines in one or more general purpose computer network machines, such as for example a dedicated remote server, data center, one or more personal computers, etc.) which is configured to manage hotspots 120.

Preferably, both mobile hotspots, i.e. the user equipment 120a, and the wireline hotspots 120b, i.e. wireless modem and routers, comprise functionalities implemented by a firmware/software product (e.g., firmware/software applications, firmware/software agents, Application Programming Interfaces—API, embedded as a library of other installed software applications etc.), connectivity app 302 in the following, that is instantiated on one or more circuitry (e.g., comprising one or more processor, microprocessor controller, dedicated Application-Specific Integrated Circuits—ASIC, volatile and/or non-volatile memories, etc.) of the user equipment 120a or wireline hotspots 120b (with the consent of a respective owner of the user equipment 120a or wireline hotspots 120b) for interaction with the connectivity managing entity 301 and for connectivity provision.

In one embodiment of the invention, a connectivity Service Set IDentifier may be assigned to each hotspot 120 comprised in the system, for being identified as a hotspot 120 of the system 300 capable of providing connectivity to smart devices 105.

In an embodiment of the invention, the system 300 provides connectivity to smart devices 105 by exploiting wireless communication technologies operating at low power (e.g., a transmission power equal to, or lower than, 100 mW, preferably equal to, or lower than, 10 mW) and within short ranges (e.g., in the order of ten meters to one hundred meters). In other words, the system 300 provides a low-power connectivity to smart devices 105.

Preferably, connectivity to smart devices 105 is provided by means of Wi-Fi technology but it should be apparent that one or more other radio communication technologies such as for example Bluetooth©, Bluetooth Smart©, Thread©, ZigBee©, Radio Frequency Identification—RFID, and Near Field Communication—NFC—may also be exploited in alternative and/or in conjunction with Wi-Fi technology.

According to an embodiment of the invention, with reference to FIG. 3B, the system 300 comprises two main functional units, namely a coverage estimator 305 and a coverage improver 310.

The coverage estimator 305 is arranged for acquiring information from hotspots 120 in the area 100, and determine a probability of network coverage for given times and locations in the area 100.

Preferably, the coverage estimator 305 is configured for forecasting an available connectivity that may be granted by (wireline and mobile) hotspots 120 at given times and in given locations in the area 100.

In an embodiment of the present invention, the coverage estimator 305 determines the probability of network coverage for given time instants (or periods) and locations in the area 100 based on the following input information: mobile 'crowdsensed' network data $CEin_1$, wireline 'crowdsensed' network data $CEin_2$, mobile big data $CEin_3$ and wireline big data $CEin_4$.

In detail, mobile crowdsensed network data $CEin_1$ comprise data acquired preferably by means of a sensing software application (indicated as sensing application in the following) installed or embedded as a library of other installed applications in user equipment 120a carried by respective owners.

The sensing application exploits networking elements of the user equipment (e.g., a Wi-Fi modem) for acquiring data about surrounding WLANs and periodically provide to the system 300 information about sensed Wireless Local Area Networks—WLANs (i.e., Wi-Fi networks provided by corresponding one or more wireline hotspots 120b) within the area 100 (provided that the user equipment is within the area 100).

For example, collected information for each WLAN in the area 100 may comprise Basic Service Set Identifier—BSSID, Service Set Identifier—SSID, Wi-Fi capabilities (such as, for example, supported encryption mechanisms), frequencies used for signals transmission, signals transmission power levels (e.g., measured in dB), model of the user equipment 120a sensing the WLAN, location information about the user equipment 120a (e.g., longitude, latitude, height, location accuracy—as determined by an operating system of the user equipment 120a, such as for example the Android operating system—and the location provider providing the location information, such as for example GPS, communication network, or Wi-Fi, etc.) that sense the WLANs, and timestamps at which each WLAN is detected.

The aim of acquiring mobile crowdsensed network data $CEin_1$ is to obtain data about where, when and how a WLAN connectivity is available in the considered area 100. Particularly, mobile crowdsensed network data $CEin_1$ provide indications of an availability of WLAN connectivity, particularly an availability of WLAN connectivity in an environment surrounding (either outside or inside a building 115) an installation location of wireline hotspots 120 where a plurality of smart devices 105 are deployed.

Alternatively or in addition, mobile crowdsensed network data $CEin_1$ may be acquired by means of land vehicles equipped with network sensing arrangements and/or by means of robotic platforms, such as for example flying drones, equipped with network sensing arrangements.

Conversely, wireline crowdsensed network data $CEin_2$ are data acquired by wireline hotspots 120*b* generally installed in buildings, such as access gateways.

For example, access gateway may acquire similar data as the mobile crowdsensed network data $CEin_1$, i.e. comprising BSSID, SSID, total bandwidth and/or average available bandwidth (e.g., measured in bit/s), frequencies used for signals transmission, signals transmission power levels (e.g., measured in dB), models of wireline hotspot 120*b* sensing nearby WLANs, location information of the sensing wireline hotspot 120*b* (e.g., street address of the building 110 where the sensing wireline hotspot 120*b* is located), and timestamps at which each WLAN is detected.

Wireline crowdsensed network data $CEin_2$ may further be exploited for understanding pattern of on/off switching of access gateways in the area 100.

Input mobile big data $CEin_3$ comprise data from a mobile communication network infrastructure serving user equipment in the area 100, such as for example a Radio Access Network—RAN (not shown) deployed in the area 100 and possibly a core network (not shown) managing thereof.

Preferably, input mobile big data $CEin_3$ may comprise locations of user equipment 120*a* in the area 100, call information, information regarding connections to the mobile communication network infrastructure and possibly usual mobility patterns followed by the user equipment 120*a* in the area 100.

For example, input mobile big data $CEin_3$ may be obtained from CDR (Call Detail Record) and/or VLR (Visitor Location Register), which are information stored by the mobile communication network infrastructure serving user equipment 120*a* in the area 100.

In an embodiment of the invention, input mobile big data $CEin_3$ may comprise additional information such as for example typical user equipment activation/deactivation patterns as a function of time.

Input wireline big data $CEin_4$ comprise data from a wired (landline) communication network infrastructure to which wireline hotspots 120*b* are connected.

Preferably, input wireline big data $CEin_4$ comprise information regarding usage patterns of wireline hotspots 120*b*, such as for example activation/deactivation patterns and patterns accounting for daily (or other intervals of time) available and used bandwidth.

For example, input wireline big data $CEin_4$ may be obtained from an Operation Support System—OSS—(not shown) of the wired communication network that acquires usage patterns of wireline hotspots 120*b* as a normal part of its operation.

In an embodiment of the invention, the coverage estimator 305 is configured for combining mobile crowdsensed network data $CEin_1$ with input mobile big data $CEin_3$ in order to obtain more effective mobile data, i.e. more effective than considering mobile crowdsensed network data $CEin_1$ or input mobile big data $CEin_3$ alone.

Similarly, the coverage estimator 305 is configured for combining wireline crowdsensed network data $CEin_2$ with input wireline big data $CEin_4$ in order to obtain more effective wireline data, i.e. more effective than considering wireline crowdsensed network data $CEin_2$ or input wireline big data $CEin_4$ alone.

Mobile crowdsensed network data $CEin_1$ and input mobile big data $CEin_3$ could be exploited (either independently or jointly) in order to identify usual paths traveled by owners carrying a user equipment 120*a*. Usual paths may be discovered by applying forecasting techniques (such as for example Triple Exponential Smoothing technique), to time-location series of data representing a user equipment 120*a* position as a function of time obtained from mobile crowdsensed network data $CEin_1$ and/or input mobile big data $CEin_3$.

In an embodiment of the present invention, anonymization techniques may be implemented by the coverage estimator 305 or directly by the mobile and wired communication network infrastructure in order to preserve a privacy of the users. For example, anonymization techniques may comprise masking any identifiers (such as for example an International Mobile Equipment Identity—IMEI, an International Mobile Subscriber Identity—IMSI, or a Mobile Subscriber ISDN Number, Media Access Control—MAC—address) associated with the hotspots 120.

In addition, the coverage estimator 305 receives, as further input information, user behavior data fb generated as a feedback based on the coverage improver 310 operation, described in the following.

Based on the input information received, the coverage estimator 305 determines latitude and longitude, timestamp of detection, and the signal transmission level (e.g., in dBm) for each hotspot 120 identified.

Preferably, an accuracy of the hotspot location of each hotspot 120 defined by latitude and longitude is evaluated, preferably by primarily exploiting mobile crowdsensed network data provided by user equipment 120*a* in the area.

In an embodiment of the invention, the coverage estimator 305 is configured for discarding as unreliable sensed data comprising a location of a hotspot 120 having an insufficient (i.e. beyond a predetermined threshold) location accuracy, i.e. insufficient with respect to a typical accuracy associated to a technology (e.g., based on Wi-Fi, GPS, mobile communication network data) used for identifying such location.

Preferably, the coverage estimator 305 is configured for identifying, through the acquired data, a height of the hotspots 120 in the area 100 which may be situated at a height corresponding to the street level (i.e., the same height of smart devices 105 such as for example of garbage bins, metering devices, vending machines, etc.) as well as at higher levels (e.g., the same height of smart devices 105 such as for example surveillance cameras, smart signposts, traffic lights, etc.).

In an embodiment of the invention, the coverage estimator 305 is further configured to estimate a bandwidth (as a function of time) available in the area 100 based on the data received.

In an embodiment of the invention, an output of the coverage estimator 305 represents a map that, for each location of the area 100, indicates whether that location is covered (i.e., connectivity is granted) by one or more hotspots 120 as a function of time.

Preferably, the coverage estimator 305 outputs a probability of coverage map pmap that accounts for a probability that a connectivity for smart devices 105 is available (and possibly a quality of such connectivity) at substantially each location within the area 100 as a function of time.

The probability of coverage map pmap built by the coverage estimator 305 allows forecasting a connectivity in the area 100.

In an embodiment of the invention, the coverage estimator 305 also exploits one or more wireless signals degradation models for building the probability of coverage map pmap, in order to provide a more effective prediction of connectivity availability. Indeed, the wireless signals degradation models allow estimating with a better accuracy wireless signals reach, not only with respect to a distance from each wireless signals source/receiver (i.e., a corresponding hotspot 120), but also with respect of the environment in the area 100 (e.g., obstacles that hinder or stop wireless signals propagation such as for example walls of buildings 115).

In addition, the wireless signals degradation models may be adjusted based on real-time environmental data (e.g., acquired from one or more same smart devices 105 in the area 100 and/or from services available on the Internet 124) regarding the area 100 both of natural or anthropic cause, such as for example rain, fog and other weather conditions or a number of interfering radio transmissions in the area 100 that could affect wireless signals degradation.

The probability of coverage of a generic location in the area 100 at a given time instant t, which is computed by the coverage estimator 305, may be mathematically represented by the following relation:

$$P = \gamma(t, \vec{s})$$

where $\gamma$ is a probability function for the probability of coverage and $\vec{s}$ is a vector comprising spatial coordinates of the generic location in the area 100.

In an embodiment of the invention the time instant is expressed in epoch time, also known as Unix time, i.e. the number of seconds elapsed since midnight of Jan. 1, 1970.

It should be noted that the probability of coverage map pmap generated by the coverage estimator 305 takes into account both the patterns of wireline hotspots 120b (e.g., activation/deactivation and available bandwidth usage) and patterns of mobile hotspots 120a (e.g., activation/deactivation, usage of connectivity and routes within the area 100 of user equipment 120a).

In an embodiment of the invention, in addition, or as an alternative, to the probability of coverage map pmap, a wireline probability of coverage map may be generated by the coverage estimator 305, the wireline probability of coverage map taking into account only the wireless network coverage, or signal coverage patterns of coverage provided by wireline hotspots 120b, and a mobile probability of coverage map may be generated by the coverage estimator 305, the mobile probability of coverage map taking into account only the signal coverage patterns of coverage provided by mobile hotspots, i.e. user equipment 120a.

The probability of coverage map(s) generated by the coverage estimator 305 is(are) received as input(s) by the coverage improver 310.

In addition, the coverage improver 310 receives also connectivity requirements creq from the smart devices 105 deployed in the area 100 (or from the controlling entity 135 that controls them).

Preferably, for each smart device 105 the connectivity requirements creq indicates requirements to be fulfilled by a hotspot 120 in order to successfully provide connectivity to the smart device 105. For example, connectivity requirements creq preferably comprise (but are not limited to) a location of the smart device 105, required location in the following, and a connection time instant or a connection time period during which the smart device 105 requires a connection with the Internet 124 (i.e., for exchanging data with other smart devices 115 and/or with the respective controlling entity 135), required time instant in the following. In addition, the connectivity requirements creq may indicate one or more wireless communication technology to be used in order to provide connectivity to the smart device 105.

It should be noted that generally, the connectivity requirements creq are provided by the smart devices 105 to the coverage improver 310 once, preferably upon the deployment of each smart device 105 in the area 100 (e.g., performed by a technician and comprising a first connection to the system 300).

The coverage improver 310, by combining the probability of coverage map(s) pmap provided by the coverage estimator 305 and the connectivity requirements creq provided by smart device 105 (or by the controlling entity 135) manages the provision of connectivity to the smart devices 105 in the area 100, provides, manages, and improves (e.g., maximizes) the connectivity available to the smart devices 105.

Preferably, the coverage improver 310 is configured for providing an opportunistic connectivity to smart devices 105 in a number of different manners.

The coverage improver 310 is arranged for providing opportunistic connectivity by exploiting at least one of the following hotspots 120 in the area 100:

a. access gateways (e.g., wireless modems and/or routers) of telecommunication provider customers, owner in the following;

b. other access gateways (e.g., wireless modems and/or routers) deployed (e.g., in telecommunication provider cabinets 130 and/or 'free Wi-Fi' arrangements) by the telecommunication provider in the area 100;

c. user equipment (e.g., smartphones and/or tablets) of telecommunication provider customers, owners in the following, and d. other user equipment for example equipped in vehicles of the telecommunication provider, such for example in motor vehicles, particularly vehicles used by telecommunication provider technicians and/or drones.

Additionally, in an embodiment of the present invention the coverage improver 310 is also arranged for evaluating and planning possible installation of dedicated network infrastructures (e.g., access gateways, repeaters, etc.) in order to guarantee coverage in locations where the previous two modes are not effective (as described in the following).

Furthermore, the coverage improver 310 may be arranged for managing a configuration of the smart devices 105 in the area 100. For example, the coverage improver 310 may provide a re-configuration of smart devices 105 in order to coordinate their connection to available network resources with a better efficacy (as described in the following).

In an embodiment of the invention the coverage improver 310 comprises a plurality of modules, each designed for preforming predetermined operations.

For example, the coverage improver 310 comprises a fixed (or wireline) opportunistic coverage configurator 315.

The fixed opportunistic coverage configurator 315 is arranged for configuring wireline hotspots 120b in order to provide the needed connectivity to the smart devices 105 in the area 100.

The coverage improver 310 similarly comprises a mobile opportunistic coverage configurator 320.

The mobile opportunistic coverage configurator 320 is arranged for configuring user equipment 120a in order to provide the needed connectivity to the smart devices 105 in the area 100.

The coverage improver 310 further comprises a users incentive generator 325.

The incentive generator 325 is configured for generating rewards to be proposed as incentives and assigned to owners of user equipment 120a and/or of wireline hotspots 120b that provide connectivity to the smart devices 105 (as described in the following).

The coverage improver 310 further comprises a users acceptance tracker 330.

The users acceptance tracker 330 is configured for monitoring a behavior of owners of user equipment 120a and/or of wireline hotspot 120b with respect to request to provide connectivity to the smart devices 105 (as described in the following).

The coverage improver 310 further comprises a smart devices re-configurator 335.

The smart device re-configurator 335 is configured for modifying a network access scheduling of smart devices 105. Preferably, the smart device re-configurator 335 schedules network connection attempts by the smart devices 105 in correspondence of time instant having the highest value forecasted by the probability of coverage map pmap at the smart devices 105 location.

Optionally, the coverage improver 310 further comprises an infrastructure planner 340.

The infrastructure planner 340 is configured for determining whether exists the need to provide additional hotspots 120, particularly wireline hotspots 120b at any location in the area 100 where the forecasts obtained through the probability of coverage map pmap indicates that the connectivity is substantially constantly below a predetermined level (or no connectivity at all is provided).

Figure 4:
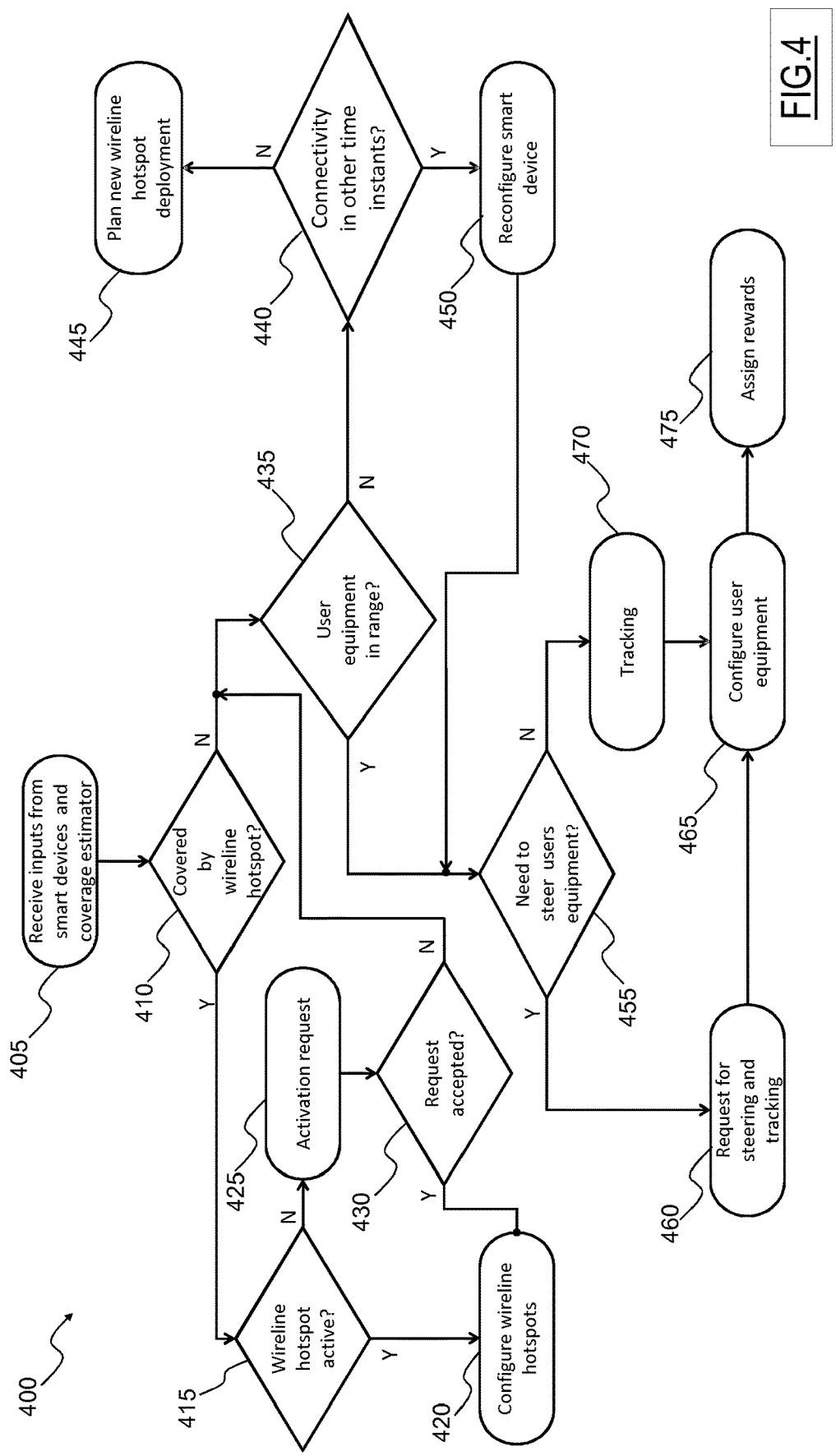
FIG. 4 is a schematic flowchart of a procedure for providing connectivity to smart devices according to an embodiment of the present invention.

The modules of the coverage improver 310 listed above cooperate in order to automatically providing and managing connectivity to the smart devices 105 in the area 100, according to a procedure for providing connectivity to smart devices according to an embodiment of the present invention of which FIG. 4 is a schematic flowchart.

Initially (block 405), the coverage improver 310 receives probability of coverage map(s) pmap generated by the coverage estimator 305 and connectivity requirements from the smart devices 105 deployed in the area 100 (or from the controlling entity 135).

In an embodiment of the invention, for each smart device 105 in the area 100, the fixed opportunistic coverage configurator 315 of the coverage improver 310 estimates a coverage availability. Preferably, the coverage improver 310 determines (decision block 410), based on the probability map pmap, whether a signal coverage provided by one or more wireline hotspots 120 reaches the smart device 105 (e.g., wireline hotspots 120 and the smart device 105 at the required location are able to exchange signals at the required time instant).

In the affirmative case (exit branch Y of decision block 410), i.e. the signal coverage provided by one or more wireline hotspots 120 reaches the smart device 105, the coverage improver 310 further checks (decision block 415) whether at least one wireline hotspot 120 of the wireline hotspots 120, whose signal coverage reach the required location, is active at the required time instant.

In the affirmative case (exit branch Y of decision block 415), i.e. at least one wireline hotspot 120, whose signal coverage reaches the required location, is active at the required time instant, the coverage improver 310 manages (block 420) the provision of the connectivity by means of wireline hotspots 120 through the fixed opportunistic coverage configurator 315, by means of a corresponding configuration instructions set conf.

The fixed opportunistic coverage configurator 315 configures wireline hotspots 120, preferably access gateways, which have a signal coverage comprising the location of the smart device 105 in order to provide the required connectivity at the required time instant.

Optionally, the fixed opportunistic coverage configurator 315 may send a provision of incentive request to the users incentive generator 325 in order to reward the owner(s) of any wireline hotspots 120b configured for providing connectivity to the location of the smart device 105.

In the negative case (exit branch N of decision block 415), i.e. none of the wireline hotspots 120, whose signal coverage reach the required location, is active, the fixed opportunistic coverage configurator 315 requests (block 425) the activation of at least one wireline hotspots 120b currently deactivated (i.e., by sending a request to the owners of the wireline hotspots 120b; for example the request may be provided to the owner by means of an email and/or an SMS sent to an email address or to a telephone number of the owner) in order to improving the connectivity at the required location of the area 100, thus ensuring connectivity to the smart device 105.

Afterwards, the fixed opportunistic coverage configurator 315 checks (decision block 430) whether at least one wireline hotspot 120, whose signal coverage reaches the required location, has been activated in response to the request.

In the affirmative case (exit branch Y of decision block 430), at least one wireline hotspot 120, whose signal coverage reaches the required location, has been activated in response to the request, the procedure proceeds at block 420 where the fixed opportunistic coverage configurator 315 configures the at least one wireline hotspot 120 activated for providing connectivity to the smart device 105.

Optionally, the fixed opportunistic coverage configurator 315 may send a provision of incentive request to the users incentive generator 325 in order to reward the owner(s) of any wireline hotspots 120b activated on request, i.e., an incentive is rewarded when a usual operating behavior of a wireline hotspots 120b is modified (by the owner(s) of the wireline hotspots 120b) for providing connectivity to the smart device 105.

In the negative case (exit branch N of decision block 415), i.e. none of the wireline hotspots 120, whose signal coverage reach the required location, has been activated on request, the procedure proceeds to block 435 described in the following.

Back to block 410, in the negative case (exit branch N of decision block 410), i.e. the connectivity provided by wireline hotspots 120 is not able to reach the smart device 105 (a lacking, or low connectivity is detected), the coverage improver 310 manages the provision of the connectivity by means of mobile hotspots 120 through the mobile opportunistic coverage configurator 320.

The mobile opportunistic coverage configurator 320 determines (decision block 435; based on the analysis of the probability of coverage map pmap) whether mobile hotspots, preferably user equipment 120a, are within a predetermined range (e.g., in the order of hundreds of meters) from the required location of the area 100 at the required time instant. In other words, the mobile opportunistic coverage configurator 320 verifies whether there one or more user equipment 120a are in the area 100 that possibly can provide connectivity (i.e., operate as mobile hotspots) to smart device 105 requesting it.

In the negative case (exit branch N of decision block 435), i.e. user equipment 120a are not available within predetermined range from the required location at the required time instant (or period) for providing connectivity to the smart device 105, the mobile opportunistic coverage configurator 320 further determines (decision block 440; based on the analysis of the probability of coverage map) whether during different time instants (or periods) different than the required time instant (or period) it is possible to provide connectivity to the smart device 105.

In the negative case (exit branch N of the decision block 440), i.e. it is not possible to provide connectivity to the smart device 105 by means of mobile hotspots 120, the coverage improver 310 activates the infrastructure planner 340 that evaluates (block 435) the possibility of providing one or more new wireline hotspots 120 at, or in proximity (i.e., within a communication range of the smart device 105) of, the location where the probability of coverage map indicates a general low, or absent, connectivity.

In an embodiment of the invention, the infrastructure planner 340 of the coverage improver 310 is configured for determining a low connectivity based on the analysis of the probability of coverage map and/or based on a low, or on a lack of data transmissions from the smart device 105 (i.e., an absence of successful communication between the smart device 105 and the controlling entity 135 within a predetermined time interval may be indicative of a low connectivity).

Preferably, the infrastructure planner 340 is configured for identifying an effective deployment of a minimum number of wireline hotspots 120b in order to provide connectivity to all the locations that the probability of coverage map indicates having a general low, or absent, connectivity, thus containing costs.

The evaluation performed by the infrastructure planner 340 may be then provided to a deployment entity (e.g., comprising one or more human operators) of the telecommunication provider for verification and approval.

In an embodiment of the invention, the infrastructure planner 340 is configured for identifying one or more possible users (e.g., private citizens and/or business enterprises) at, or in proximity, of the required location to which propose a subscription to services provided by the telecommunication provider in order to deploy a hotspot 120, preferably a wireline hotspot 120b, thus providing connectivity to the smart device(s) 105 at, or in proximity of, the required location. Preferably, a number of incentives (e.g., temporary increase of available bandwidth, temporary increase of available priority channels for accessing to one or more predetermined services, discounts on services fees, extension of subscribed services and/or additional services) generated by the user incentive generator 325 may be offered to the possible user in order to increase a probability of successful deployment of the wireline hotspot 120b at, or in proximity, the required location.

Back at decision block 440, in the affirmative case (exit branch Y of the decision block 440), i.e. it is possible to provide connectivity to the smart device 105 by means of mobile hotspots 120, but at one or more different time instants (or periods), the coverage improver 310 activates the smart device re-configurator 335 that re-configure (block 450) a communication scheduling of the smart device 105 in order to attempt connections with the communication network during a target time instant when connectivity is more reliable (e.g., the probability of coverage map has a maximum, or is at least above the minimum connectivity threshold, in the required location). Smart device re-configuration allows a more effective management of the available supply power (e.g., provided by batteries) of the smart device 105, avoiding connection attempts during time instant wherein connectivity is not available.

The re-configuration of the smart device 105 may be performed by an ad hoc provision of connectivity attainable by means of a user equipment 120a purposely sent at, or in proximity of, the required location.

Once the smart device 105 is re-configured, the procedure proceeds at block 455 described hereinbelow.

Back at decision block 435, in the affirmative case (exit branch Y of decision block 435), i.e. mobile hotspots 120, preferably a user equipment 120a, are available within the predetermined range from the required location at the required time instant (or period) for providing connectivity to the smart device 105, the mobile opportunistic coverage configurator 320 further determines (decision block 455; based on the analysis of the probability of coverage map) whether there is the need to steer a user equipment 120a from its usual path towards the required location in order to grant a reliable connectivity to the smart device 105 deployed in the required location.

In the affirmative case (exit branch Y of decision block 455), i.e. there is the need to steer a user equipment 120a from its usual route towards the required location, a request for steering the user equipment 120a from a usual path is issued (block 460) by the mobile opportunistic coverage configurator 320 towards one or more user equipment 120a within the predetermined range.

For example, the connectivity app installed in user equipment 120a is configured for receiving the request for steering and prompt them to the owner of the user equipment 120a.

Preferably, the request for steering proposes the slightest deviation possible from the usual paths of the user equipment 120a.

Even more preferably, the request for steering is generated by the mobile opportunistic coverage configurator 320 cooperating with the incentive generator 325. Particularly, the incentive generator 325 proposes at least one incentive for persuading the owner of the user equipment 120a to steer from its usual path in order to reach a predetermined distance (depending from the wireless technology exploited for providing connectivity) from the required location in order to provide an improved connectivity to the smart device 105 through the user equipment 120a.

Incentives generated by the incentive generator 325 may comprises, but are not limited to, temporary increase of available bandwidth, temporary increase of available priority channels for accessing to one or more predetermined services (e.g., streaming services), discounts on services fees, extension of subscribed services and/or additional services (e.g., free access to multimedia contents).

Contextually to the issuing of request from steering, the users acceptance tracker 330 starts tracking the one or more user equipment 120a that received the request for steering and have accepted it (i.e., the owner of the user equipment 120a declares that will steer from its usual path) the procedure continues at block 465 described hereinbelow where the one or more user equipment 120a are configured for providing connectivity to the smart device 105.

Back at decision block 455, in the negative case (exit branch N of decision block 455), i.e. there is no need to steer a user equipment 120a, the users acceptance tracker 330 starts tracking (block 470) one or more user equipment 120a whose associated usual path reaches, or is in proximity of, the required location at the required time instant (or period) and the one or more user equipment 120a are configured (block 465), by means of a corresponding configuration instructions set conf, for providing connectivity to the smart device 105.

In an embodiment of the invention, user equipment 120a may be automatically configured by the mobile opportunistic coverage configurator 320 through the connectivity app (possibly, upon approval from the owner of the user equipment 120*a*) for providing connectivity to the smart device 105 (i.e. for operating as a mobile hotspot).

For example, the user equipment 120*a* may be configured for activating Wi-Fi functionalities once reached the required location at the required time instant (or period) and allocating part of the communication resources of the user equipment 120*a* for providing connectivity to the smart device 105.

Finally (block 475), the users acceptance tracker 330 verifies that the operating behavior of the user equipment 120*a* (hotspot) has been modified as requested, and the incentives are attributed to user equipment 120*a* that effectively reached the required location at the required time instant (or period), i.e., an incentive is rewarded when a usual operating behavior (e.g., a usual path) of a user equipment 120*a* is modified (by the owner of the user equipment 120*a*) for providing connectivity to the smart device 105.

In addition, user behavior data fb are generated based on the tracking of the user equipment 120*a* and based on the rewarding of the incentives, to be used for optimizing the estimation of the probability of coverage map(s) pmap generated by the coverage estimator 305.

It should be noted that the procedure described above may undergo several modification, e.g. similar steps with the same functions may substitute several steps or portions thereof, some non-essential steps may be removed, or additional optional steps may be added, the steps may be performed in different order, in parallel or overlapped (at least in part), without departing from the scope of the present invention.

In summary, blocks 455 to 475 allow dynamically implementing an opportunistic network exploiting mobile hotspots, preferably user equipment 120*a* carried by respective owners, in the area 100. Particularly, the procedure envisages engaging owners of user equipment 120*a* to actively participating to the system 300 operation.

The user equipment 120*a* together with the wireline hotspots 120*b* become a part of the system 300 and through them a capillary provision of connectivity to smart devices 105 is possible without requiring deployment of dedicated communication infrastructure elements.

Advantageously, user equipment 120*a* are used as bridges to the Internet 124 leveraging on their data connection (i.e. by using them as mobile hotspots). Connection between user equipment 120*a* and smart devices 105 might be achieved through different communication technologies (e.g., Wi-Fi connection, Wi-Fi direct, Bluetooth and Bluetooth smart according to communication equipment comprised in both user equipment 120*a* and smart devices 105), also a combination of different communication technologies may be envisaged.

The capillary provision of connectivity to smart devices 105 exploiting user equipment 120*a* is effectively promoted by incentives proposed to the owner of the user equipment 120*a*, which are attributed when a user equipment 120*a* effectively provides connectivity to smart devices 105 and/or when the owner of the user equipment 120*a* steers from the usual path and reaches the required location at the required time instant (or period).

In alternative or in addition, gamification techniques (e.g., attribution of ranks, points, etc.) may be implemented in order to enhance the engagement of the owners of user equipment 120*a* in reaching selected required locations at required time instants (or periods). For example, reaching selected required locations at required time instants may be proposed as competitive/collaborative tasks or challenges to a number of owners of user equipment 120*a*.

In an embodiment of the invention, the coverage improver 310 by means of the users acceptance tracker 330 monitors performances of user equipment 120*a* in providing connectivity to smart devices 105 and determines a ranking of user equipment 120*a* based on such performances. For example, performances of the user equipment 120*a* may comprise how often the user equipment 120*a* reaches required locations at given required times, lengths of deviations from usual paths, etc.

The ranking of user equipment 120*a* may be exploited for achieving an even more effective opportunistic connectivity by having the coverage estimator 305 determine a reliability (as connectivity provider) of user equipment 120*a* in the area 100.

Moreover, the mobile opportunistic coverage configurator 320 may be configured for preliminary sending requests to provide connectivity to the smart devices 105 to user equipment 120*a* having the highest rankings. This allows reducing a total number of user equipment 120*a* involved in the provisioning of connectivity for each smart device 105 and therefore a reduction in the incentives offered and assigned to owners of user equipment 120*a*, which lead to a reduction in resources required for the awarding the rewards.

In an embodiment of the invention, the information of users acceptance tracker 330 are analyzed by the incentive generator 325 and compared with incentives generated by the incentive generator 325 in order to assess which incentives are the most effective, i.e. which incentives are more successful in persuading owners of user equipment 120*a* to provide connectivity to the smart devices 105. Based on such analysis, more effective and/or customized incentives may be progressively generated by the incentive generator 325.

In an embodiment of the invention, the incentive generator 325 is configured for assigning incentives also for maintaining the connectivity app installed and/or active on the user equipment 120*a* or in the in wireline hotspot 120*b* in order to grant a sufficient number of user equipment 120*a* available for providing connectivity to smart devices 105.

In an embodiment of the present invention, the system 300 may be configured for providing in advance the requests for connectivity through the connectivity app installed on the user equipment 120*a* and/or the wireline hotspots 120*b*.

Preferably, a list of request locations and respective requested time instants were connectivity will be required by smart devices 105 may be provided to user equipment 120*a* with a predetermined time advance (e.g., in the order of hours) with respect to the requested time instants. Even more preferably, the list of request locations and respective requested time instants may be based on usual paths of each user equipment 120*a*.

This time advance allows the owners of user equipment 120*a* to planning in advance detours from usual paths resulting in a better effectiveness both in terms of connectivity provision and owners of user equipment 120*a* ease of participating to the opportunistic network of the system 300.

Similarly, a request for maintaining active a wireline hotspots 120*b* in proximity of a request location during requested time instants may be sent (e.g., by means of an email, SMS, etc.) in advance to the owner of wireline hotspots 120*b*, possibly together with a proposed incentive.

It should be noted that the coverage estimator 305 and the coverage improver 310 may operate with different periodicities. For example, the coverage estimator 305 may update the probability of coverage map with a periodicity with a daily, weekly and/or monthly periodicity, while the coverage improver 310 may manage the provisioning of the opportunistic network in real-time or with a hourly and/or daily periodicity.

In an embodiment of the invention, the system 300 may allow an initial configuration of smart devices 105 in order to connect to secured wireless connections (e.g., featuring data encryption and/or requiring password authentication) reaching the location where the smart device 105 is deployed. For example, in case of connectivity provided by hotspots 120, particularly wireline hotspots 120, implementing a Wi-Fi technology, WPA-Enterprise authentication techniques (also known as 802.1x Authentication as described in IEEE Std 802.11-2012) could be used. Alternatively, in a public Wi-Fi infrastructure, captive-portal authentication techniques (e.g., a Wi-Fi Hotspot network access technique where an HTTP request from a mobile device is redirected to a server for authentication) could be exploited.

In both cases, in order to configure a generic smart device 105, credentials (e.g. username and passwords) for connection to hotspots 120 must be provided and the following sub-procedure may be implemented.

For example, initially an identification code of the smart device 105 is acquired, e.g. by a user equipment 120a (e.g., operated by a technician installing the smart device 105) scanning a QR code or a RFID/NFC tag on the smart device 105 and transmitted to the connectivity managing entity 301.

The connectivity managing entity 301 signals back to the user equipment 120a the credentials for the smart device 105 (possibly in an encrypted format).

The user equipment 120a transmits the credentials to the smart device 105. For example, in case the user equipment 120a is using Wi-Fi technology to communicate with the smart device 105, the smart device 105 is arranged of acting as an Access Point when in unconfigured state (i.e., before receiving the credentials).

Advantageously, the QR code or the RFID/NFC tag on the smart device 105 can also comprise configuration information (e.g., SSID and WPA-PSK key when Wi-Fi technology is used) for allowing the user equipment 120a communicating with the smart device 105 when the latter is in the unconfigured state.

The invention claimed is:

1. A method for providing a wireless communication network for a smart device, the smart device comprising wireless communication circuitry, the method comprising:
analyzing information regarding a plurality of hotspots in a geographic area in which the smart device is deployed, each hotspot of the plurality of hotspots being configured to establish one or more wireless communications within a predetermined range;
estimating, based on the analyzing, an extent of coverage of the wireless communication network provided by the plurality of hotspots; and
checking, based on the estimating, whether at least one hotspot of the plurality of hotspots in the geographic area is able to provide wireless communication to the smart device, and
if the at least one hotspot in the geographic area is able to provide the wireless communication to the smart device, configuring the at least one hotspot to provide the wireless communication to the smart device, otherwise, if no hotspot in the geographic area is able to provide the wireless communication to the smart device, activating at least one selected hotspot in order to provide the wireless communication to the smart device, and
wherein the activating of the at least one selected hotspot comprises:
selecting the at least one hotspot from the plurality of hotspots,
sending a request to activate the at least one selected hotspot in order to provide the wireless communication to the smart device, and
verifying that the at least one selected hotspot has been activated as requested.

2. The method according to claim 1,
wherein the plurality of hotspots comprises at least one wireline hotspot comprising a wired connection to a computer network and at least one antenna for wireless communicating with the smart device, and
wherein the selecting the at least one hotspot from the plurality of hotspots comprises selecting the at least one wireline hotspot, and
wherein the sending the request to activate the at least one selected hotspot comprises sending the request to an owner of the at least one selected hotspot.

3. The method according to claim 1,
wherein the plurality of hotspots comprises at least one mobile hotspot configured to wirelessly connect to the smart device,
wherein the selecting the at least one hotspot from the plurality of hotspots comprises selecting the at least one mobile hotspot, and
wherein the method further comprises sending, to an owner of the at least one mobile hotspot, a request for diverting from a traveled usual path in order to provide the wireless communication to the smart device.

4. The method according to claim 3, further comprising tracking the at least one mobile hotspot after the sending of the request for the diverting from the traveled usual path.

5. The method according to claim 1, wherein the checking whether the at least one hotspot in the geographic area is able to provide the wireless communication to the smart device comprises checking whether the at least one hotspot is able to provide the wireless communication at a requested location and at a requested time instant defined by a connectivity request associated with the smart device.

6. The method according to claim 1, wherein the estimating the extent of the coverage of the wireless communication network provided by the plurality of hotspots comprises determining activation/deactivation patterns of the plurality of hotspots as a function of time.

7. The method according to claim 6, wherein the estimating the extent of the coverage of the wireless communication network provided by the plurality of hotspots further comprises determining a location of the at least one mobile hotspot as a function of time.

8. The method according to claim 7, wherein the estimating the extent of the coverage of the wireless communication network provided by the plurality of hotspots further comprises determining a probability of coverage map that accounts for a probability of availability of the wireless communication network as a function of position of the at least one mobile hotspot within the geographic area and time.

9. The method according to claim 8, wherein each position of the at least one mobile hotspot within the geographic area in the probability of coverage map is defined by spatial information comprising longitude, latitude, and height information.

10. The method according to claim 8, further comprising modifying a wireless communication network access scheduling of the smart device in correspondence of a time instant having a greater probability of the availability of the wireless communication network based on the probability of coverage map.

11. The method according to claim 1, further comprising:
rewarding the at least one selected hotspot with an incentive upon ascertaining that the at least one selected hotspot has been activated as requested.

12. The method according to claim 11,
wherein the smart device exploits the wireless communication network for exchanging data with a controlling entity, and
wherein the rewarding the at least one selected hotspot with the incentive comprises ascertaining whether the smart device has exchanged data with the controlling entity.

13. The method according to claim 12, wherein the rewarding the at least one selected hotspot with the incentive comprises rewarding the at least one selected hotspot with the incentive whether the smart device has exchanged data with the controlling entity, and/or whether the at least one tracked mobile hotspot has diverted from a traveled usual path.

14. The method according to claim 11, wherein the rewarding the at least one selected hotspot with the incentive comprises ascertaining whether the at least one tracked mobile hotspot has diverted from a traveled usual path in order to provide the wireless communication to the smart device.

15. The method according to claim 11, wherein the rewarding the at least one selected hotspot with an incentive comprises selecting as the incentive at least one among an increase of an available bandwidth or a temporary increase of an available bandwidth assigned to the hotspot, an increase of available bitrate or a temporary increase of available bitrate, priority channels for accessing one or more predetermined services, discounts on services fees, extension of subscribed services, and/or additional services.

16. The method according to claim 1,
wherein the hotspots of the plurality of hotspots comprise connectivity functionalities for providing wireless communication to the smart device, and
the method further comprises rewarding the at least one selected hotspot with an incentive for maintaining active connectivity functionalities.

17. The method according to claim 1, wherein the analyzing the information regarding the plurality of hotspots comprises:
exploiting at least one hotspot of the plurality of hotspots for acquiring data regarding the extent of coverage of the wireless communication provided by the hotspots of the plurality of hotspots, and
exploiting the at least one hotspot for acquiring data regarding mobility and/or activation/deactivation patterns of the hotspots of the plurality of hotspots.

18. A system for providing a wireless communication network for a smart device, the smart device comprising wireless communication circuitry, the system comprising:
a coverage estimator configured to:
analyze information regarding a plurality of hotspots in a geographic area in which the smart device is deployed, each hotspot being configured to establish one or more wireless communications within a predetermined range, and
estimate, based on the analyzing, an extent of coverage of the wireless communication network provided by the plurality of hotspots; and
a coverage improver configured to:
receive the estimation of the extent of coverage of the wireless communication network performed by the coverage estimator,
check, based on the estimation, whether at least one hotspot of the plurality of hotspots in the geographic area is able to provide wireless communication to the smart device, and
if the at least one hotspot in the geographic area is able to provide the wireless communication to the smart device, configure the at least one hotspot to provide the wireless communication to the smart device,
otherwise, if no hotspot in the geographic area is able to provide the wireless communication to the smart device, activate at least one selected hotspot in order to provide the wireless communication to the smart device,
wherein, in order to activate the at least one hotspot, the coverage improver is further configured to:
select the at least one hotspot from the plurality of hotspots,
send a request for activating the at least one selected hotspot in order to provide the wireless communication to the smart device, and
verify that the at least one selected hotspot has been activated as requested.

19. The system according to claim 18,
further comprising a connectivity managing entity comprising at least one among a single computer, a network of distributed computers, and a network of distributed virtual machines,
wherein the coverage estimator and the coverage improver are implemented in the connectivity managing entity.

20. The system according to claim 19, wherein each hotspot of the plurality of hotspots comprises functionalities configured to manage an interaction with the connectivity managing entity, which is implemented by a firmware and/or a software product, which is instantiated circuitry of the hotspot.

21. The system according to claim 18, wherein the coverage improver is further configured to reward the at least one selected hotspot with an incentive upon ascertaining that the at least one selected hotspot has been activated as requested in order to provide the wireless communication to the smart device.

* * * * *